US011741087B2

(12) United States Patent
Cohen et al.

(10) Patent No.: US 11,741,087 B2
(45) Date of Patent: Aug. 29, 2023

(54) AUTOMATICALLY GENERATED GRAPHICAL USER INTERFACE APPLICATION WITH DYNAMIC USER INTERFACE SEGMENT ELEMENTS

(71) Applicant: ServiceNow, Inc., Santa Clara, CA (US)

(72) Inventors: Maor Cohen, Tel Aviv (IL); Gilad Haimov, Petah-Tikva (IL); Sean Andrew Bradley Bowrin, San Diego, CA (US); Alexander Fedayev, Netanya (IL)

(73) Assignee: ServiceNow, Inc., Santa Clara, CA (US)

( * ) Notice: Subject to any disclaimer, the term of this patent is extended or adjusted under 35 U.S.C. 154(b) by 218 days.

(21) Appl. No.: 17/140,989

(22) Filed: Jan. 4, 2021

(65) Prior Publication Data

US 2022/0215019 A1 Jul. 7, 2022

(51) Int. Cl.
  *G06F 16/24* (2019.01)
  *G06F 16/245* (2019.01)
  *G06F 16/242* (2019.01)
  *G06F 16/2455* (2019.01)
  *G06F 16/2457* (2019.01)

(52) U.S. Cl.
  CPC .... *G06F 16/2428* (2019.01); *G06F 16/24552* (2019.01); *G06F 16/24564* (2019.01); *G06F 16/24573* (2019.01)

(58) Field of Classification Search
  None
  See application file for complete search history.

(56) References Cited

U.S. PATENT DOCUMENTS

| | | | |
|---|---|---|---|
| 7,047,242 B1 * | 5/2006 | Ponte | G06F 16/951 |
| | | | 707/999.005 |
| 2011/0010195 A1 * | 1/2011 | Cohn | G06F 16/2282 |
| 2013/0086507 A1 * | 4/2013 | Poston | G06F 16/26 |
| 2013/0311475 A1 * | 11/2013 | Emanuel | G06F 16/36 |
| 2015/0088693 A1 * | 3/2015 | Moore | G06F 16/957 |
| 2018/0182257 A1 * | 6/2018 | Sang | G06F 16/245 |
| 2019/0026847 A1 * | 1/2019 | Stencil, Jr. | G06F 16/24 |
| 2019/0244539 A1 * | 8/2019 | Yan | G06F 16/245 |
| 2021/0319179 A1 * | 10/2021 | Muffat | G06F 16/355 |
| 2021/0342785 A1 * | 11/2021 | Mann | G06F 16/9536 |

* cited by examiner

*Primary Examiner* — Son T Hoang
(74) *Attorney, Agent, or Firm* — Van Pelt, Yi & James LLP

(57) ABSTRACT

An identification of a dynamic specification is received via a form for building an application. The dynamic specification is able to be utilized to execute one or more database queries to dynamically obtain a list of categories for different embedded screens of an automatically generated end-user application. The end-user application is configured to dynamically generate for a user interface of the end-user application a different selectable user interface element for each category of the list of categories dynamically obtained by executing the one or more database queries and upon selection of one of the selectable user interface elements, provide on the user interface a corresponding embedded screen of the different embedded screens.

20 Claims, 8 Drawing Sheets

AUTOMATICALLY GENERATED GRAPHICAL USER INTERFACE APPLICATION WITH DYNAMIC USER INTERFACE SEGMENT ELEMENTS

BACKGROUND OF THE INVENTION

Cloud-based services allow customers to store, access, and manage small to large volumes of customer data that can be accessed remotely from a variety of clients. The stored customer data can be a diverse assortment of data including structured data with interrelationships. For example, stored customer data can include information on employees, their timesheets, tasks that make up their timesheets, and the days and weeks the tasks are associated with. The ability to access and manage the customer data can be provided by a variety of cloud-based services. These services can allow customers to interact with the customer data, for example, by viewing and modifying the data. The cloud-based nature of the services allows the customer data to be accessed with a high level of operational performance but with limited management requirements required from the customer and the ability to scale as demand changes.

BRIEF DESCRIPTION OF THE DRAWINGS

Various embodiments of the invention are disclosed in the following detailed description and the accompanying drawings.

DETAILED DESCRIPTION

Figure 1:
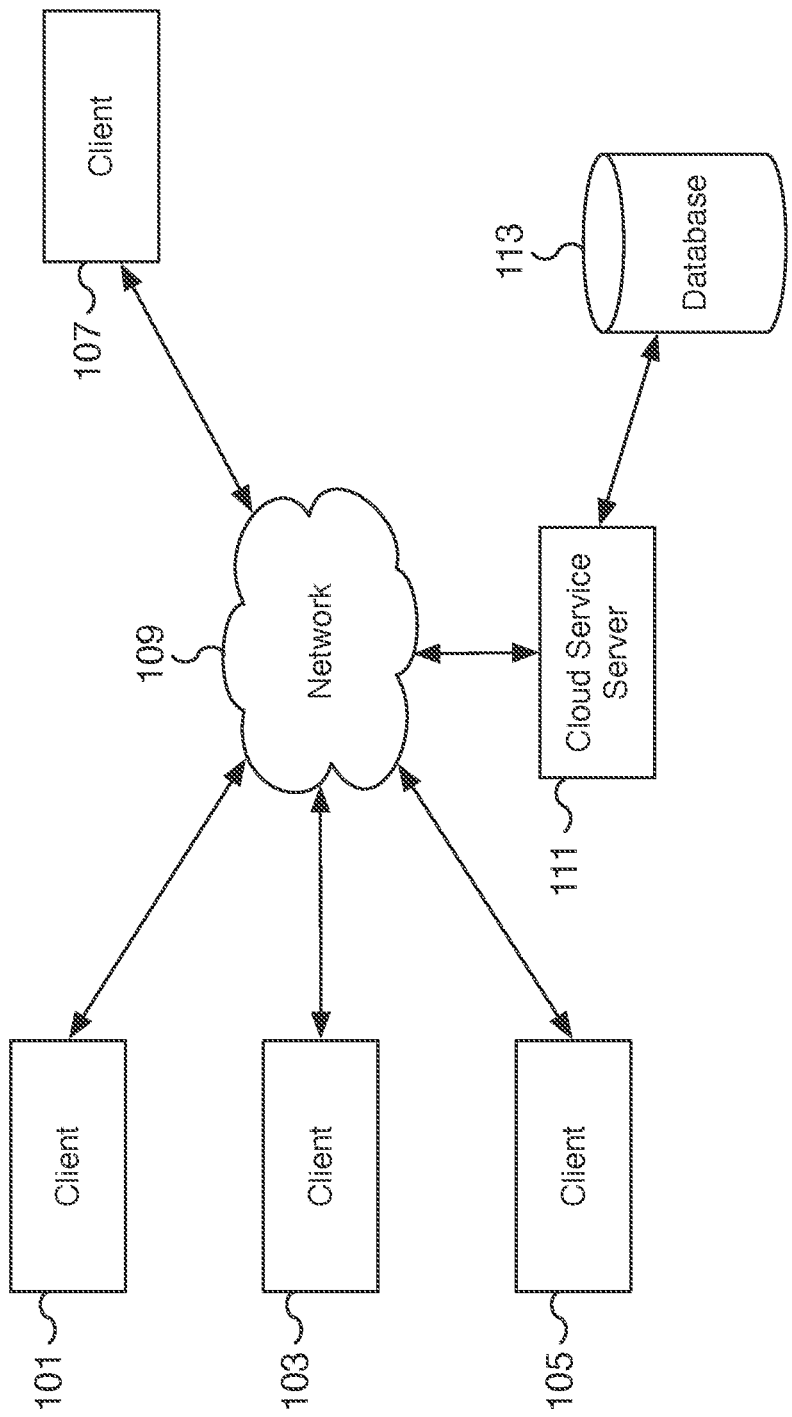
FIG. 1 is a block diagram illustrating an example of a network environment for an application utilizing dynamic segment elements.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamic user interface segment elements for an end-user application are disclosed. Using the disclosed techniques, an administrator can configure a custom automatically generated application such as a mobile application for end-users that includes application screens with both static and dynamic segment elements. The configuration process requires little to no programming knowledge and provides non-software developers with the ability to create customized graphical user interface applications using static and dynamic user interface elements. In various embodiments, the static user interface segment elements can reference a group of dynamic user interface segment elements. For example, a static segment can reference all events in a particular week spanning seven specific days. The dynamic segments can represent any day in the week spanning the seven specific days that cross-references with the static segment. In various embodiments, the dynamic segments can be configured to only correspond to days with events taking place and to exclude days without any events scheduled. As events are added and removed to the days of the week, new dynamic segments are added or existing dynamic segments are removed, as appropriate. For example, when an event is added to a day that previously had no events, a new dynamic segment is added corresponding to that day. Similarly, when the only event of a day is removed, the day is no longer included as one of the dynamic segments. A static segment covering seven days can be associated with as few as zero dynamic segments to as many as seven dynamic segments, where each dynamic segment corresponds to one of the seven days. In some embodiments, each dynamic segment can include and display additional information related to the particular segment. For example, a dynamic segment representing events for a particular day can be updated to include the total number of hours scheduled for events that day. As the events of the day change, the total number of hours can be dynamically updated. In various embodiments, a static segment can include and display additional information related to all its related dynamic segments.

In various embodiments, the configurable dynamic segments are applicable for a wide variety of end-user applications and can be particularly helpful for visualizing and displaying information organized by categories or groupings. For example, a timesheet application can display a static segment that references a week along with dynamic segments for any day of the week that includes timesheet events, such as tracked time and the work performed for that tracked time period. Similarly, a personal contacts application can include a static segment that references a range of letters, such as the letters C-E of the alphabet. Different static segments can reference different ranges of letters (e.g., A-B, F-H, etc.). The corresponding dynamic segments of a particular static segment can include only the contact names that match the referenced range of letters of a static segment, such as the contacts with last names that begin with the letters C, D, or E. In various embodiments, when a dynamic segment is selected, additional data associated with the dynamic segment is shown in a dynamically updated embedded screen. For example, in the timesheet example, all database records of timesheet events for the particular day of the selected dynamic segment can be retrieved and displayed on the embedded screen. When a different dynamic segment is selected, the embedded screen is updated with events corresponding to the newly selected dynamic segment. In the personal contacts application example, the embedded screen can include contact information associated with the contact of the selected dynamic segment, such as the selected contact's full name, address, phone numbers, email address, etc. When a different dynamic segment is selected, the contact information in the embedded screen is updated with contact information corresponding to the contact of the newly selected dynamic segment. In some embodiments, static and/or dynamic segments can also be configured with actions. For example, in the event a segment has no associated records, actions can be included in the embedded screen to create a new record and/or to copy an existing record, among other actions.

In some embodiments, a form is provided for building an application, such as an end-user mobile application. For example, a web service provides a web form via a web application for configuring a custom application for displaying and managing customer data. One or more screens of the mobile application include multiple segments including static and dynamic segments for displaying the customer data. For example, a static segment can reference a grouping such as a group of days for a week. The dynamic segments can be associated records that belong to the grouping such as days that belong to the corresponding week. An identification of a dynamic specification is received via the form. The identification of the dynamic specification is able to be utilized to execute one or more database queries to dynamically obtain a list of categories for different embedded screens of an end-user application. For example, the end-user application can be configured with multiple dynamic segments representing the categories of days of a corresponding week. The dynamic specification includes a query to identify all the categories of days belonging to the week and queries for collecting any records associated with any of the identified days. Information associated with each identified day can be retrieved and displayed in a different embedded screen.

In some embodiments, the end-user application is automatically generated. For example, based on the provided configuration via the form including the dynamic specification, the application is automatically generated. The end-user application is configured to dynamically generate for a user interface of the end-user application a different selectable user interface element for each category of the list of categories dynamically obtained by executing the one or more database queries and upon selection of one of the selectable user interface elements, provide on the user interface a corresponding embedded screen of the different embedded screens. For example, a user interface is generated that includes dynamic segment user interface elements. Each dynamic segment corresponds to a different category, such as a different day in the categories of days of a corresponding week. Each dynamic segment is rendered as a different selectable user interface element, for example, by displaying the day (e.g., Monday), month (e.g., December), date (e.g., 19th), and any other specified information such as the number of hours associated with the day. In some embodiments, the selectable user interface element is a user interface icon with displayable content labels. The dynamic segment and displayed information are dynamically retrieved by executing one or more configured database queries. When the selectable user interface element for a dynamic segment element is selected, an embedded screen element of the user interface is updated to show information or actions specific to the dynamic segment. For example, for a dynamic segment corresponding to events scheduled for a specific day, detailed information of each event scheduled for that day is displayed and can include information such as the start time, end time, duration, and description for each event. Examples of actions can include user interface elements for performing actions such as copying events from a different day or creating a new event for that day.

FIG. 1 is a block diagram illustrating an example of a network environment for an application utilizing dynamic segment elements. In the example, clients 101, 103, 105, and 107 and cloud service server 111 are communicatively connected via network 109. Network 109 can be a public or private network. In some embodiments, network 109 is a public network such as the Internet. In some embodiments, clients 101, 103, 105, and 107 are on a private local network separate from cloud service server 111. In the example shown, cloud service server 111 is communicatively connected to database 113. Cloud service server 111 and database 113 may be on the same network and/or hosted in the same datacenter or connected via another topology than the one shown. In various embodiments, cloud service server 111 utilizing database 113 hosts cloud services such as a web application for configuring and/or deploying an application such as an end-user mobile application. Cloud service server 111 utilizing database 113 can also host customer data that is dynamically served to the deployed application, which can view/modify the relevant data via a user interface that includes at least dynamic segments and associated embedded screens. In some embodiments, cloud service server 111 hosts configuration management database (CMDB) services. Additional services provided by cloud service server 111 can include resource discovery, resource management, event management, cloud management, maintenance, and compliance services, among others. In the various scenarios, database 113 can be utilized to store data related to the cloud-hosted services offered by cloud service server 111.

In some embodiments, clients 101, 103, 105, and 107 are example client systems used to connect to cloud services offered by cloud service server 111. Clients 101, 103, 105, and 107 may have different software/hardware configurations and can include laptops, desktop computers, mobile devices, tablets, kiosks, smart televisions, or other appropriate computing devices. In some embodiments, the clients are used to configure an application, such as an end-user mobile application by at least in part configuring the user interface for displaying data hosted by a cloud service. The application can be automatically generated and deployed to clients, such as clients 101, 103, 105, and 107. Once running on clients, the automatically generated application can access cloud service server 111 to dynamically retrieve data from database 113.

In some embodiments, database 113 is utilized by cloud service server 111 to store information relevant to clients 101, 103, 105, and 107, such as customer data that is dynamically retrieved by an automatically generated application. The data can include data organized by categories and stored across multiple related tables. As one example, the generated application can be a timesheet application. The stored data can include timesheet information where timesheet events can be organized by categories of days of a corresponding week, and where each day can include multiple timesheet records. As another example, the generated application can be a personal contacts application. The stored data can include contact information where contacts can be organized by categories of letter groupings, and where each letter grouping can include multiple personal contact records. In some embodiments, database 113 is a CMDB database. For example, database 113 can be used to store resource discovery information as part of a CMDB service for managing client resources. The CMDB data can be organized by categories and displayed/managed via an automatically generated application. Although database 113 is shown connected to cloud service server 111, database 113 may be located in a variety of network locations as appropriate. For example, database 113 may be located external to a local network that includes clients 101, 103, 105, and 107. In some embodiments, database 113 is not directly connected to cloud service server 111 but only communicatively connected to cloud service server 111. In some embodiments, database 113 is a cloud-based database server and may be part of and/or collocated with cloud service server 111.

Although single instances of some components have been shown to simplify the diagram of FIG. 1, additional instances of any of the components shown in FIG. 1 may also exist. For example, cloud service server 111 may include one or more different servers and/or multiple distributed components. Similarly, database 113 may include one or more database servers and may not be directly connected to cloud service server 111. For example, database 113 and its components may be replicated and/or distributed across multiple servers, components, and/or locations. In some embodiments, components not shown in FIG. 1 may also exist.

Figure 2:
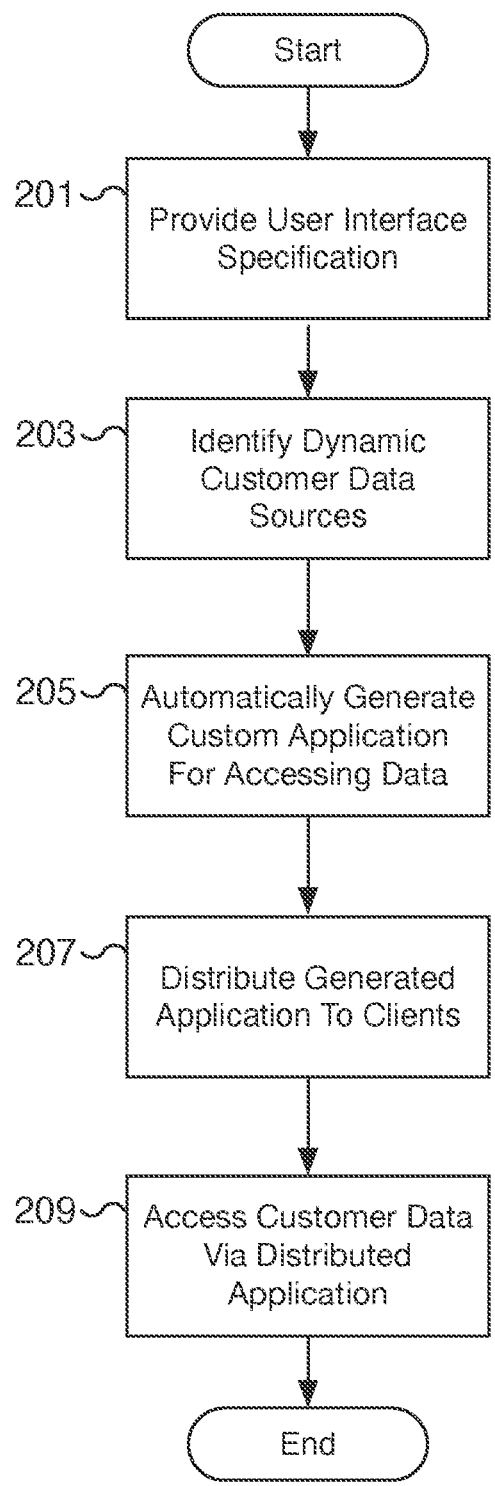
FIG. 2 is a flow chart illustrating an embodiment of a process for configuring a graphical user interface application for dynamically accessing customer data.

FIG. 2 is a flow chart illustrating an embodiment of a process for configuring a graphical user interface application for dynamically accessing customer data. Using the process of FIG. 2, an administrator with little to no programming experience can configure an application to dynamically access and manage customer data. The application can be automatically generated and deployed to target client devices such as mobile phones, laptops, and desktops, among others. In various embodiments, the configured application is a graphical user interface application that can dynamically retrieve and display data organized into categories. The retrieved data can be stored in one or more databases across multiple related tables. In some embodiments, the process of FIG. 2 is performed via clients such as clients 101, 103, 105, and 107 of FIG. 1 by accessing a cloud-based form hosted by a cloud service server such as cloud service server 111 of FIG. 1. In some embodiments, the data is stored in a database such as database 113 of FIG. 1.

At 201, a user interface specification is provided. For example, using a form such as one provided via a web application, a user interface is configured and a corresponding user interface specification is provided. The specification can define a screen of an application for accessing customer data. In some embodiments, the specified screen can include a header portion, a footer portion, a set of user interface elements corresponding to category data, and an embedded screen. The set of user interface elements corresponding to category data can include both static and dynamic portions represented by static and dynamic user interface segment elements. For example, for a timesheet application, a static segment can correspond to a week of the year with a specific start date and end date. The corresponding dynamic segments can correspond to categories within the static segment, such as categories of days of the week. The embedded screen can be linked to the selected segment, such as a specified static segment or one of the dynamic segments. The embedded screen can be further configured to display information related to the selected segment. In various embodiments, the relative sizes and other display parameters of the user interface elements are also configured and provided as part of a specification.

At 203, dynamic customer data sources are identified. For example, using a form such as one provided via a web application, the tables of a database are identified as sources for an application. In some embodiments, a relationship between the tables is also identified and/or one or more queries to access the tables are specified. The tables may be organized to store the data based on categories and linked by references such as foreign keys or another appropriate technique. For example, a timesheet application can store timesheet entries that are organized and viewed by days of a week. The data can be dynamically updated as records are added, removed, and/or modified. For example, dynamic customer data associated with customer timesheets can be identified by specifying the associated database tables. A first timesheet_tasks_in_day table can be identified and can store timesheet tasks with columns for a unique identifier, a task category, a day, a state status, a task status, a reference to a timesheet day of a week record, the total task hours per day, and a reference to a worker record to associate with a task. A second timesheet weeks table can be identified and can store week information with columns for a unique identifier, a start day of a week, a corresponding end day of a week, the total work hours for a week, a state status for a week, and a reference to a worker record to associate with a week. A third timesheet_days_in_week table can be identified and can store days of a week information with columns for a unique identifier, a date, a week day, a state status, a reference to a week record, the total work hours for a day, and a reference to a worker record to associate with a day. Additional tables can be referenced such as a worker table for storing information of referenced workers.

In some embodiments, at 203, at least three related database tables are identified as customer data sources. For example, a first database table is identified with records identifying a category, a second database table is identified with records referencing at least one of the records of the first database table, and a third database table is identified with records referencing at least one of the records of the second database table. Using a timesheet application as an example, records of the first database table can each identify a week of a year, records of the second database table can each identify a day in a week of a year, and records of the third database table can each identify a task in a day in a week of a year. Other schemas for categorizing and storing the data are appropriate as well. In various embodiments, as part of identifying the dynamic customer data sources, the data sources are linked to various specified user interface elements and/or components.

At 205, a custom application is automatically generated for accessing data. For example, a mobile application is compiled and built that allows end-users to access the customer data identified at 203. The application is automatically generated based at least in part on the user interface specification provided at 201 and the data sources specification provided at 203. In various embodiments, creating the application does not require any programming, for example, by a software developer, allowing users with little to no programming ability to create customized applications. The application dynamically updates the user interface by including or removing dynamic user interface segments to accurately reflect changes to the customer data. In some embodiments, the application includes corresponding embedded screens for each dynamic segment. When a dynamic segment is selected, a corresponding embedded screen can display detailed information based on the selected dynamic segment.

At 207, the generated application is distributed to clients. For example, the application is deployed to clients for accessing the data identified at 203. In some embodiments, the clients are mobile phones and the generated application is a mobile application for an end user that includes a graphical user interface for managing customer data. In some embodiments, the application is distributed to clients such as clients 101, 103, 105, and 107 of FIG. 1.

At 209, the customer data is accessed via the distributed application. For example, users can access the customer data identified at 203 using the application distributed at 207. As the customer data changes, for example, as records are added, deleted, and/or modified, the data is dynamically updated at the application. In some embodiments, the application can access and manage the data, for example, by modifying, deleting, and creating records at the data sources identified at 203. In various embodiments, the data and its categories are dynamically retrieved and displayed using dynamic segments. For example, for a timesheet application that allows a user to view timesheet entries by days of a week, the days associated with a week can be retrieved and displayed as dynamic segments. The dynamic nature of the application allows the user interface to only display the days of the week that include timesheet tasks. The displayed days are presented as dynamic segments with corresponding embedded screens when a dynamic segment is selected. For example, when a segment is selected, the associated data (e.g., the timesheet tasks for that selected day) is retrieved and shown in an embedded screen of the application.

Figure 3:
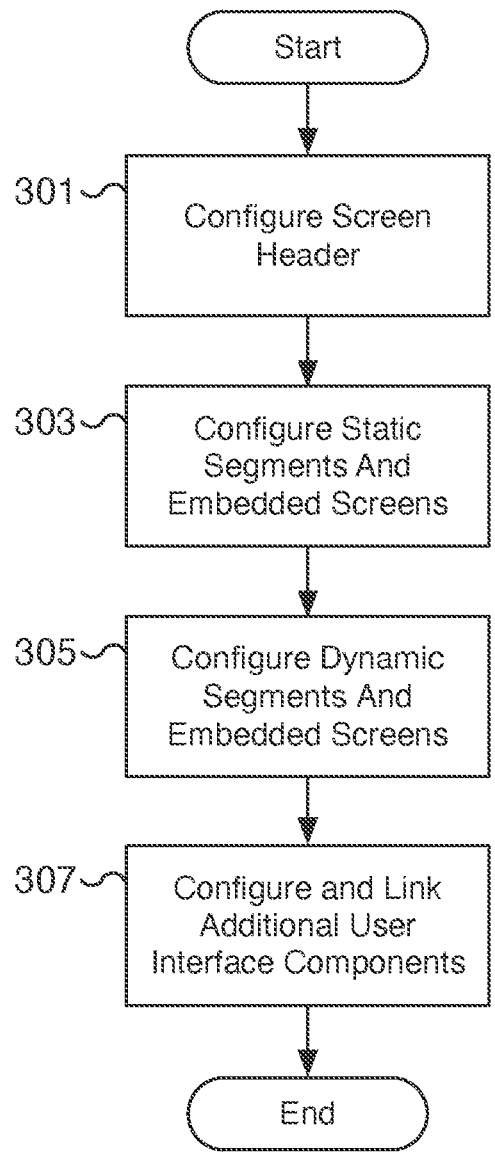
FIG. 3 is a flow chart illustrating an embodiment of a process for configuring a graphical user interface of an automatically generated application.

FIG. 3 is a flow chart illustrating an embodiment of a process for configuring a graphical user interface of an automatically generated application. Using the process of FIG. 3, portions of an application's user interface screen for accessing dynamic customer data can be designed with little to no programming experience. By specifying the design, the application can be automatically generated and deployed to target client devices such as mobile phones, laptops, and desktops, among others. In various embodiments, the configured user interface corresponds to at least a portion of a screen of an application for accessing data organized into categories. The retrieved data can be stored in one or more databases across multiple related tables. In some embodiments, the process of FIG. 3 is performed at 201 and/or 203 of FIG. 2. In some embodiments, the process of FIG. 3 is performed via clients such as clients 101, 103, 105, and 107 of FIG. 1 by accessing a cloud-based form hosted by a cloud service server such as cloud service server 111 of FIG. 1. In some embodiments, the data is stored in a database such as database 113 of FIG. 1.

At 301, a screen header is configured. For example, a header user interface element for a screen of a mobile application is configured. The header user interface element can correspond to a user interface element shown at the top of the screen. The header element can be configured to display information related to all segments of the screen, regardless of which segment category is selected. For example, for a timesheet application, the header element can be configured to include user interface components for a title, a start date of a week, an end date of a week, and a total number of work hours for the week. The configuration can also include display parameters such as relative sizes and positions of the different header components, among other parameters. The display parameters including the relative size configuration parameters allow a user interface and its user interface elements, such as the screen header, to expand to fill the usable screen dimensions. For example, when a mobile device is rotated between portrait mode and landscape mode (and vice versa), the user interface expands/contracts appropriately based on the display parameters such as the relative size configuration settings. In various embodiments, the data sources and associated data source queries for the header screen are specified and linked to the corresponding header user interface components.

At 303, static segments and corresponding embedded screens are configured. For example, one or more static segments are configured, and each configured static segment can have a corresponding configuration for an embedded screen. For example, a timesheet application can have a single static segment corresponding to a segment for a single week of the year. In some embodiments, display properties of the static segments are configured including display parameters such as relative sizes and positions and how each segment should respond to user interface events such as scrolling and device rotation. For example, a static segment can be configured to be sticky with a fixed non-scrollable location and will not disappear or move even when a user attempts to scroll past the static segment. The embedded screens can be configured to display information corresponding to the static segment, such as all tasks for the entire week. In some embodiments, actions can be configured in an embedded screen. For example, one or more user interface buttons or similar user interface components can be added to an embedded screen to perform actions such as copying another week's tasks or sharing one or more displayed tasks. In various embodiments, the data sources and associated data source queries for the static segments and corresponding embedded screens are specified and linked to the corresponding static user interface segments and embedded screens.

At 305, dynamic segments and corresponding embedded screens are configured. For example, one or more dynamic segments are configured, and each configured dynamic segment can have a corresponding configuration for an embedded screen. For example, a timesheet application can have a single static segment configured at 303 that corresponds to a single week of the year. Dynamic segments can be configured to correspond to the category of the days of the week, with one dynamic segment for each day of the week with tasks. In some embodiments, all dynamic segments are configured together. For example, a query can be specified to retrieve all records that should appear as dynamic segments. In some embodiments, display properties of the dynamic segments are configured including display parameters such as relative sizes and positions and how each segment should respond to user interface events such as scrolling and device rotation. For example, dynamic segments can be configured to disappear when a user attempts to scroll past a dynamic segment to reveal additional dynamic segments. The embedded screens can be configured to display information corresponding to the selected dynamic segment, such as all tasks for the selected day. In some embodiments, actions can be configured in an embedded screen. For example, one or more user interface buttons or similar user interface components can be added to an embedded screen to perform actions such as copying a task, deleting a task, or sharing a task. In various embodiments, the data sources and associated data source queries for the dynamic segments and corresponding embedded screens are specified and linked to the corresponding dynamic user interface segments and embedded screens.

At 307, additional user interface components are configured. In some embodiments, a screen with static and dynamic segments includes additional user interface elements for accessing additional functionality. At 307, the additional user interface components can be configured. For example, one or more additional user interface components, such as a screen footer or menu can be configured and included in a screen. In various embodiments, the data sources and associated data source queries for the additional user interface components are specified and linked to the corresponding additional user interface components.

Figure 4:
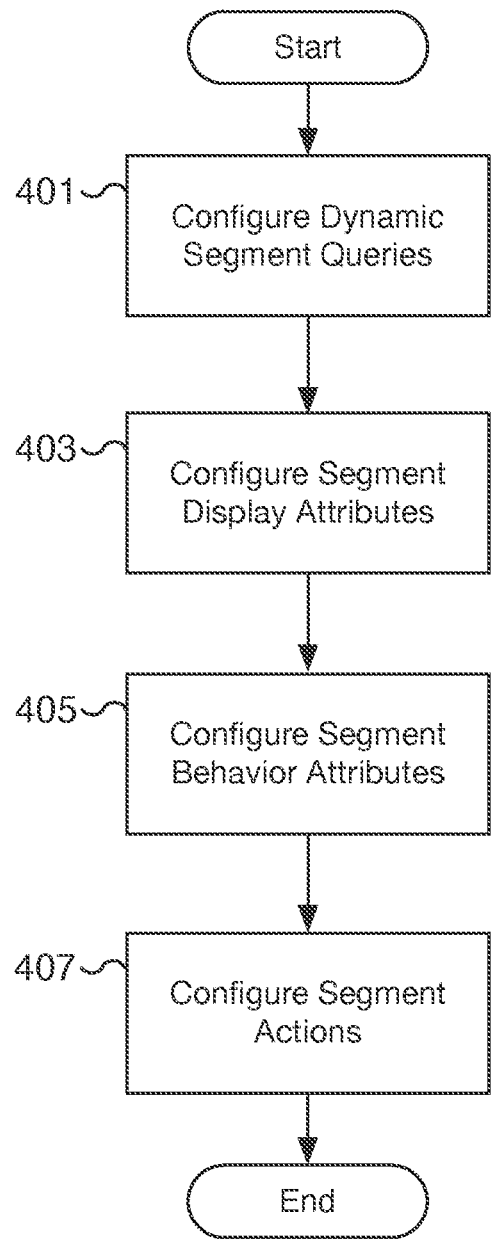
FIG. 4 is a flow chart illustrating an embodiment of a process for configuring a dynamic user interface segment of an automatically generated application.

FIG. 4 is a flow chart illustrating an embodiment of a process for configuring a dynamic user interface segment of an automatically generated application. Using the process of FIG. 4, portions of an application's user interface screen for accessing dynamic customer data can be designed with little to no programming experience. In various embodiments, the configured user interface corresponds to at least a portion of a screen of an application for accessing data organized into categories. The retrieved data can be stored in a database across multiple related tables. In some embodiments, the process of FIG. 4 is performed at 201 and/or 203 of FIG. 2 and/or at 305 of FIG. 3. In some embodiments, the process of FIG. 4 is performed via clients such as clients 101, 103, 105, and 107 of FIG. 1 by accessing a cloud-based form hosted by a cloud service server such as cloud service server 111 of FIG. 1. In some embodiments, the data is stored in one or more databases such as database 113 of FIG. 1.

At 401, dynamic segment queries are configured. For example, one or more queries associated with configuring dynamic segments are provided as a dynamic specification for implementing a user interface. In some embodiments, a query is specified to retrieve all records for which a dynamic segment should be created. For example, for a timesheet application, a query is specified that when executed retrieves the days of a week that have timesheet tasks. Days with tasks are retrieved by the query and any days that do not have tasks are not retrieved. As a result, dynamic user interface segments are generated only for the days of the week that include tasks. In various embodiments, queries can be also configured to execute to retrieve information for an embedded screen associated with a selected dynamic segment. For example, a query can be specified to retrieve all timesheet tasks of a selected dynamic segment corresponding to a specific day. In various embodiments, the configured queries identify the relevant data sources required to access the customer data. In some embodiments, query parameters such as caching parameters are also configured. For example, a query can be configured to cache parameters for a certain time interval.

At 403, segment display attributes are configured. For example, the size and positioning of the dynamic segments are configured. In some embodiments, the display attributes are configured as relative attributes. For example, display text can be configured as a relative size (e.g., small, medium, and large) and not as specific pixel sizes. As another example, positioning can be configured as a relative location (e.g., left aligned, horizontally centered, right aligned, top aligned, vertically centered, and/or bottom aligned) and not with specific pixel locations. Other display attributes, such as foreground color, background color, outline color, selection color, highlight color, hover color, unselected color, and unselectable color, etc. can be specified as appropriate.

At 405, segment behavior attributes are configured. In various embodiments, how a segment should behave in response to events, such as user touch events or update events, is configured. For example, in some embodiments, a segment can be made sticky with a fixed non-scrollable location so that it cannot be scrolled off the screen or moved to make room to display additional segments in response to a scroll event. The relative location of the segment can be positioned and configured to ignore events such as scrolling events directed at the user interface. Similarly, a segment can be configured to disappear when a user attempts to scroll past a dynamic segment to reveal additional dynamic segments. As another example, a segment behavior can be configured to refresh all corresponding data for the segment and/or all segments based on a user event such as a selection event. For example, a dynamic segment can be configured to trigger a refresh event for the corresponding static segment and/or header element when tasks of the dynamic segment are modified.

At 407, segment actions are configured. For example, one or more actions for a segment can be configured and associated with a dynamic segment for display on its associated embedded screen. Actions can include user interface elements with corresponding functionality such as adding a new task, sharing a task, deleting a task, etc. In some embodiments, actions can be displayed based on a trigger condition, such as when there are zero records associated with a segment or a record with a deadline is overdue. In various embodiments, the actions are optional, and no actions are required for a dynamic segment.

Figure 5:
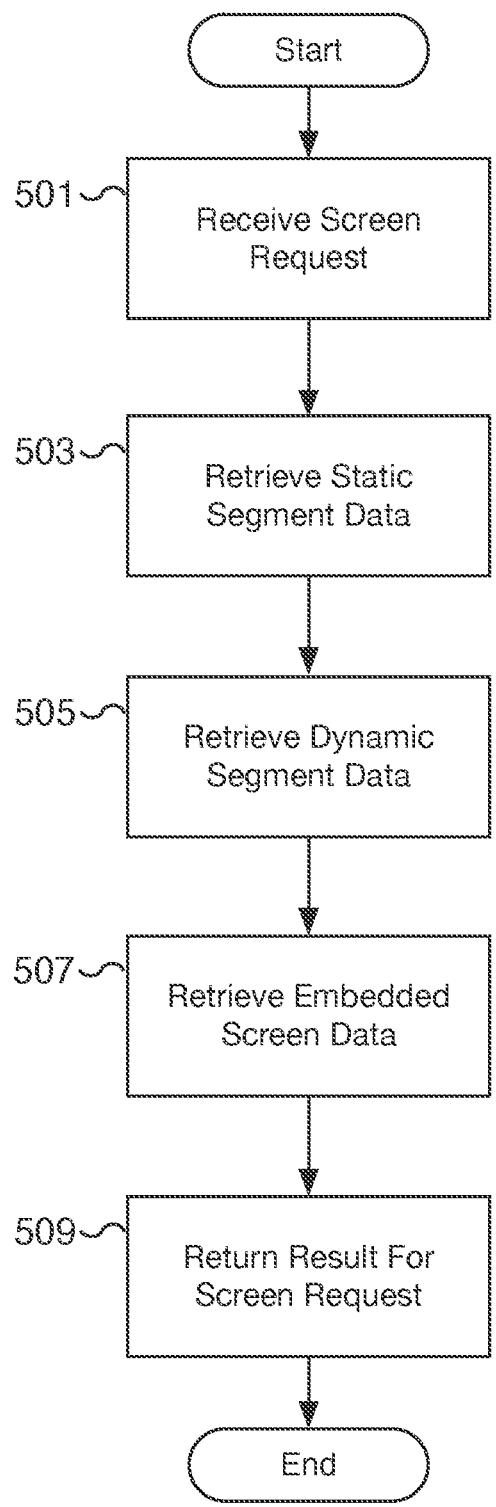
FIG. 5 is a flow chart illustrating an embodiment of a process for responding to a user interface with dynamic user interface segments.

FIG. 5 is a flow chart illustrating an embodiment of a process for responding to a user interface with dynamic user interface segments. For example, using the process of FIG. 5, a cloud service server returns the requested data necessary to render a user interface screen of an application that utilizes dynamic segments. The requested data can be initiated by a client request and can be associated with at least a portion of a screen of an automatically generated end-user application running on a client. In some embodiments, the process of FIG. 5 is performed in response to application events such as user events from a user interacting with the user interface and/or refresh events triggered by application functionality. In various embodiments, the returned data includes dynamic customer data organized as categories and stored in one or more databases across multiple related tables. In various embodiments, the corresponding application and its user interface are created and distributed using the processes of FIGS. 2-4. In some embodiments, the process of FIG. 5 is performed by a cloud service server such as cloud service server 111 of FIG. 1 in response to and to support clients such as clients 101, 103, 105, and 107 of FIG. 1. In some embodiments, the data is stored in a database such as database 113 of FIG. 1.

At 501, a screen request is received. For example, an application enters or refreshes an application screen that includes a static user interface element, dynamic user interface segment elements, and an embedded screen. In some embodiments, the application screen includes additional user interface elements such as a header and/or footer. To render the appropriate customer data associated with the screen, a request is made by a client application and received at 501. For example, to render the correct number of dynamic segments, customer data is required to determine which dynamic segments to include in the user interface. In some embodiments, a specific segment of the screen is active and/or selected and an associated embedded screen of the segment is also shown on the application screen. The embedded screen can require data for populating user interface elements of the embedded screen, such as tasks associated with a selected day segment for a timesheet application. In various embodiments, the screen request received at 501 includes a request for data needed for populating the various user interface elements of the screen including data for a header, one or more static segments, one or more dynamic segments, and associated embedded screens as needed.

At 503, static segment data is retrieved. For example, data for populating one or more static segments is retrieved by executing a query on a data source such as a customer database. The retrieved data can be used to populate a static segment and/or a header associated with the static segment. For example, for a timesheet application, a week segment can be implemented as a single static segment with days of the week implemented as multiple dynamic segments. The static segment data retrieved can be used to update the contents of the static segment and/or the header. In various embodiments, the queries executed are configured at 201 and/or 203 of FIG. 2 and/or at 301 and/or 303 of FIG. 3.

At 505, dynamic segment data is retrieved. For example, data for populating one or more dynamic segments is retrieved by executing a query on a data source such as a customer database. The retrieved data can be used to determine the number of dynamic segments to include in the user interface and the content to display in any included dynamic segments. For example, for a time sheet application, a week segment can be implemented as a static segment with days of the week implemented as dynamic segments. The number of dynamic segments to include can be as few as zero segments to as many as seven segments (i.e., one for each day of the week) depending on which days of the week have timesheet tasks. The retrieved dynamic segment data can be used to determine how many dynamic day segments to include in the application user interface. Moreover, each included dynamic segment can include and display data associated with that day, such as the total work hours for tasks assigned to that day. The retrieved dynamic segment data can also be used to determine the contents of any included dynamic segments. In various embodiments, the dynamic segment data is retrieved by executing one or more database queries configured at 201 and/or 203 of FIG. 2 and/or at 305 of FIG. 3.

At 507, embedded screen data is retrieved. For example, data for populating an embedded screen is retrieved by executing a query on a data source such as a customer database. The retrieved embedded screen data can be used to determine the number of entries to include in the embedded screen and the contents of each entry. For example, for a time sheet application, an embedded screen can display the timesheet tasks associated with a selected segment (regardless of whether the segment is a static or dynamic segment). The embedded screen data retrieved can be based on the selected segment and is used to determine how many tasks are associated with the selected segment. For example, a selected day segment can include five timesheet tasks that are based on the retrieved embedded screen data that include five task records. The retrieved embedded screen data can also be used to display details of each of the included tasks, such as the task name, the hours for the task, whether the task was completed, and a work category associated with the task, among other details. In various embodiments, the embedded screen data is retrieved by executing one or more database queries configured at 201 and/or 203 of FIG. 2 and/or at 303 and/or 305 of FIG. 3.

At 509, a result to the screen request is returned. For example, the data retrieved at 503, 505, and/or 507 is packaged into a screen result and returned to the client that initiated the request received at 501. In some embodiments, the screen request is returned as a single response or multiple responses and can be cached, for example, at either the cloud service server or at the appropriate client.

Figure 6:
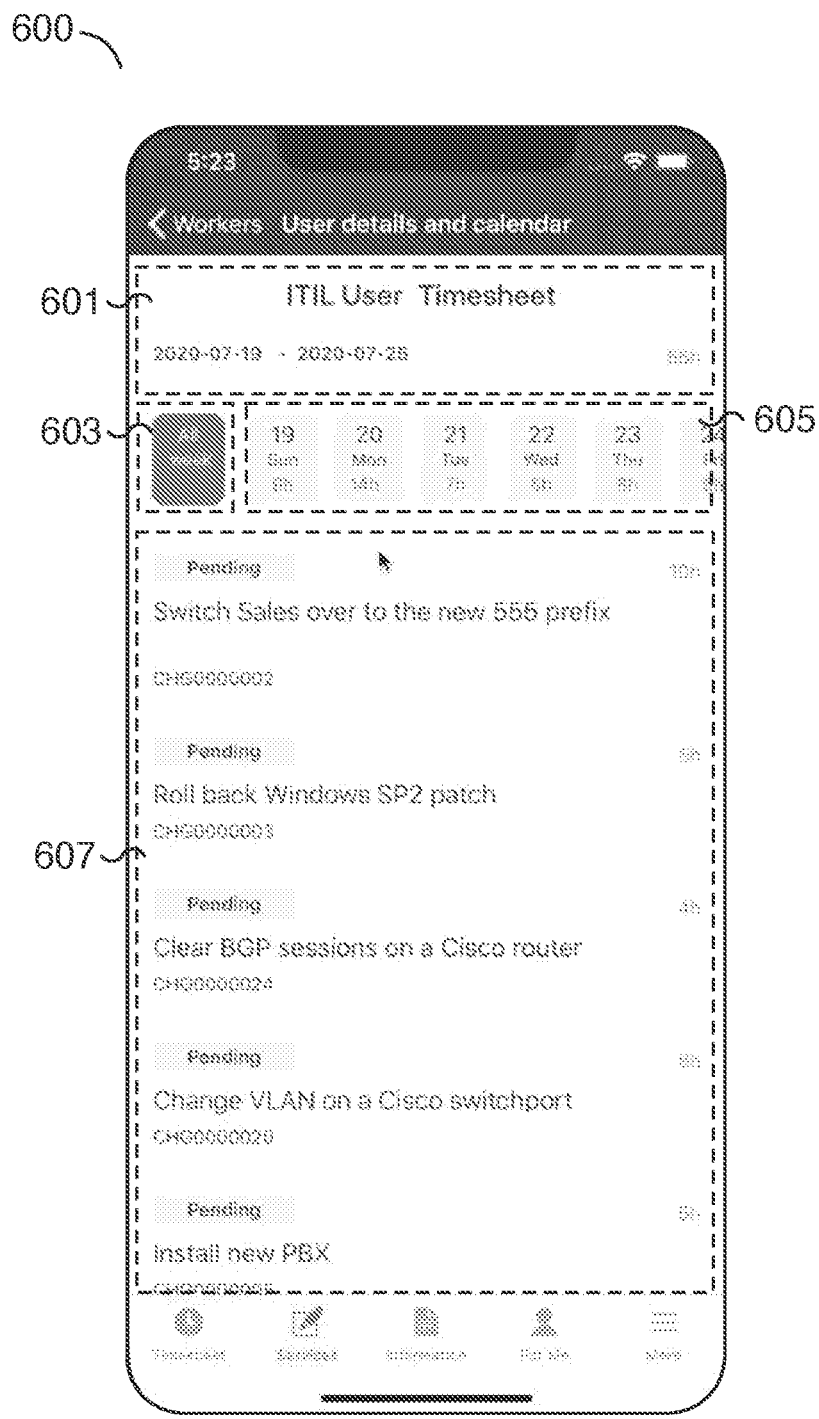
FIG. 6 is a diagram illustrating an embodiment of a user interface for displaying dynamic user interface segment elements.

FIG. 6 is a diagram illustrating an embodiment of a user interface for displaying dynamic user interface segment elements. In the example shown, user interface 600 includes screen header element 601, static user interface segment element 603, dynamic user interface segment elements 605, and embedded screen element 607. In various embodiments, user interface 600 is configured and populated using the processes of FIGS. 2-5 and displayed on an application running on a client such as one of clients 101, 103, 105, and 107 of FIG. 1 using data retrieved by a cloud service server such as cloud service server 111 of FIG. 1 from a database such as database 113 of FIG. 1. In various embodiments, user interface 600 is a screen of an automatically generated application that can be created by a user with little to no programming experience via a cloud service.

In the example shown, user interface 600 corresponds to a screen of an end-user mobile application for timesheet tracking. The timesheet data is organized by week and by days of the week using a static segment for the week and dynamic segments for the days of the week. Screen header element 601 includes timesheet information for the specified week. In the example shown, the week selected is the week that includes the days Jul. 19, 2020 through Jul. 25, 2020. The total hours associated with timesheet tasks (e.g., 55 hours) is also displayed in screen header element 601. In various embodiments, the contents of screen header element 601 are retrieved dynamically as described above and correspond to the data of static user interface segment element 603. Static user interface segment element 603 corresponds to all timesheet days of the week displayed in screen header element 601. In the example shown, static user interface segment element 603 is selected and displays the text label "All week." In various embodiments, the display and behavior properties of static user interface segment element 603 are configured using a form application.

In the example shown, dynamic user interface segment elements 605 is positioned to the right of static user interface segment element 603 and includes five dynamic user interface segment elements corresponding to the days Sunday the 19th, Monday the 20th, Tuesday the 21st, Wednesday the 22nd, Thursday the 23rd, and Friday the 24th. The rightmost segment corresponding to Friday the 24th is only partially displayed and indicates that dynamic user interface segment elements 605 can be scrolled horizontally to reveal additional dynamic segments. Also shown in each displayed segment of dynamic user interface segment elements 605 is the total task hours for each segment day. The number of segments in dynamic user interface segment elements 605 is determined dynamically using the techniques described above. For example, the retrieved data of a screen request is used to determine the number and contents of the segments of dynamic user interface segment elements 605. In the example shown, the segments of dynamic user interface segment elements 605 are not selected.

In various embodiments, an application user interface screen can include one or more embedded screens. In the example shown, user interface 600 includes embedded screen element 607. Embedded screen element 607 is associated with selected static user interface segment element 603 and displays five different timesheet tasks, each with a status (e.g., "Pending"), a task name, and identifier code (e.g., "CHG0000002"), and a total number of task hours (e.g., "10 h"). The data for the embedded screens is retrieved via a screen request as described above and used to dynamically populate embedded screen element 607 with the appropriate entries. In various embodiments, additional tasks can be revealed by scrolling vertically.

In various embodiments, the display and behavior properties of the user interface elements of user interface 600 are configurable and include properties such as the font type, relative font size, font colors, background colors, stickiness of the user interface element, etc. For example, in some embodiments, the font size, colors, alignment, and positioning of the labels for static and dynamic segments of static user interface segment element 603 and dynamic user interface segment elements 605 can be configured via a web application form.

Figure 7:
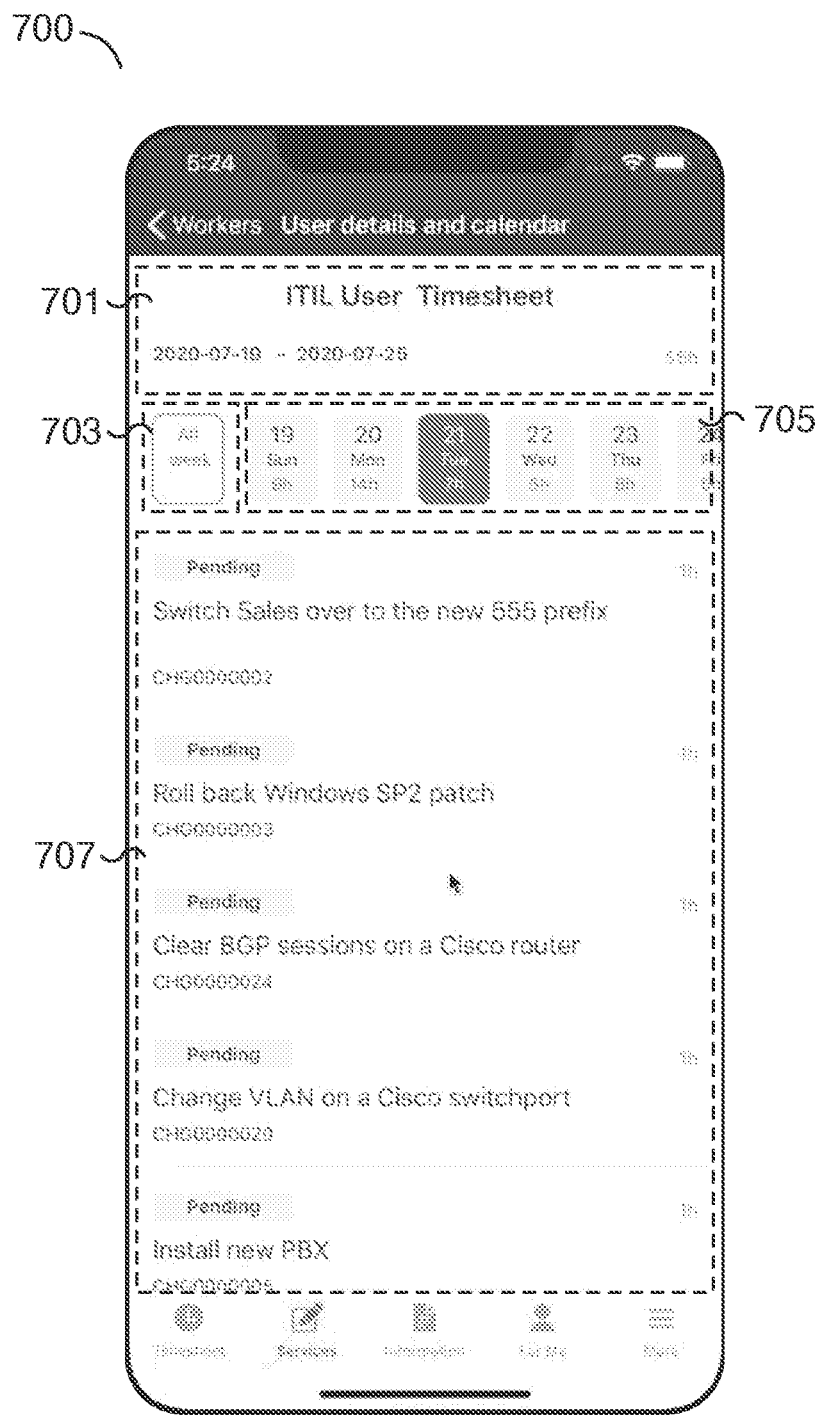
FIG. 7 is a diagram illustrating an embodiment of a user interface for displaying dynamic user interface segment elements with a selected dynamic segment.

FIG. 7 is a diagram illustrating an embodiment of a user interface for displaying dynamic user interface segment elements with a selected dynamic segment. In the example shown, user interface 700 includes screen header element 701, static user interface segment element 703, dynamic user interface segment elements 705, and embedded screen element 707. User interface 700 corresponds to user interface 600 of FIG. 6 but with a segment of dynamic user interface segment elements 705 selected and embedded screen element 707 updated to reflect this selection. In various embodiments, user interface 700 is configured and populated using the processes of FIGS. 2-5 and displayed on an application running on a client such as one of clients 101, 103, 105, and 107 of FIG. 1 using data retrieved by a cloud service server such as cloud service server 111 of FIG. 1 from a database such as database 113 of FIG. 1. In various embodiments, user interface 700 is a screen of an automatically generated application that can be created by a user with little to no programming experience via a cloud service.

In the example shown, user interface 700 corresponds to a screen of an end-user mobile application for timesheet tracking where the dynamic segment corresponding to Tuesday the 21st is selected. As with the user interface application of FIG. 6, the timesheet data is organized by week and by days of the week using a static segment for the week and dynamic segments for the days of the week. Similar to screen header element 601 of FIG. 6, screen header element 701 includes timesheet information for the specified week but unlike embedded screen element 607 of FIG. 6, embedded screen element 707 displays information corresponding to the selected segment of dynamic user interface segment elements 705. In FIG. 7, instead of selecting static user interface segment element 703 (which is shown as not being selected), the dynamic segment corresponding to Tuesday the 21st of dynamic user interface segment elements 705 is selected and highlighted. In some embodiments, the segment is selected in response to a user touch event such as a touch event to select the displayed dynamic segment for Tuesday the 21st.

In various embodiments, in response to selecting a dynamic segment, data associated with the selected segment is retrieved as part of a screen request. For example, the contents of the timesheet tasks of embedded screen element 707 are retrieved as part of a screen request. In the example shown, embedded screen element 707 reflects the tasks of the selected segment associated with Tuesday the 21st of dynamic user interface segment elements 705. Embedded screen element 707 is shown with five timesheet tasks similar to embedded screen element 607 of FIG. 6 but with total task hours that reflect the selected day and not the entire week. For example, the first task with identifier code "CHG0000002" is shown as taking one hour. In various embodiments, as different dynamic segments are selected, the embedded screen is updated to reflect the tasks of the newly selected segment. Similarly, when tasks of an embedded screen are updated, the embedded screen the tasks are associated with is updated. In some embodiments, the contents of other elements such as elements for a static segment and a corresponding header screen (e.g., elements that correspond to a weekly view for the timesheet example) are refreshed and updated as well. In the example shown, in the event a new task is added to Tuesday the 21st, total hours for the dynamic segment for Tuesday the 21st are updated as well as the total hours for the static segment and header corresponding to the week that includes Tuesday the 21st.

Figure 8:
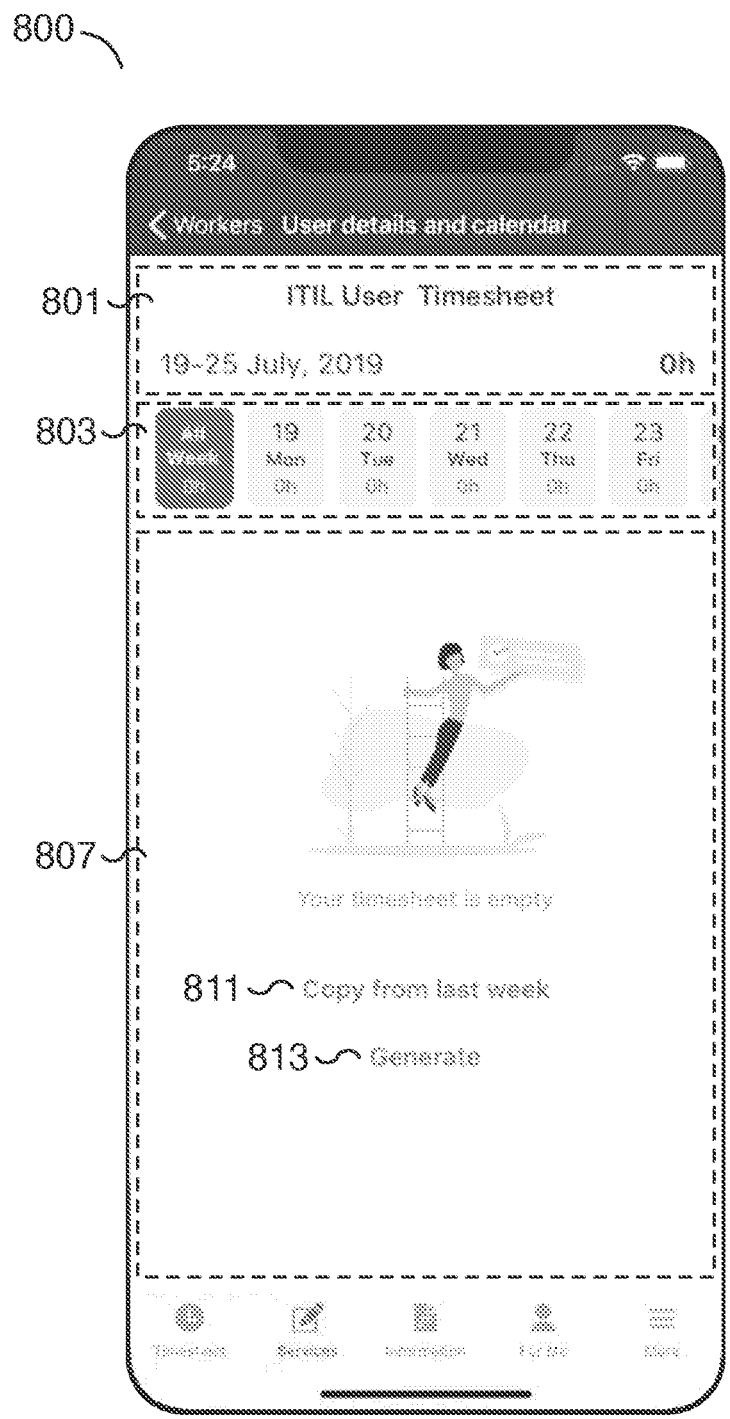
FIG. 8 is a diagram illustrating an embodiment of a user interface for displaying user interface segment elements with associated actions.

FIG. 8 is a diagram illustrating an embodiment of a user interface for displaying user interface segment elements with associated actions. In the example shown, user interface 800 includes screen header element 801, static and dynamic user interface segment elements 803, and embedded screen element 807. Embedded screen element 807 includes action user interface elements 811 and 813. User interface 800 is a variation of the timesheet application of FIGS. 6 and 7 where the dynamic segments are displayed even in the event no tasks exist for a specific day. In various embodiments, user interface 800 is configured and populated using the processes of FIGS. 2-5 and displayed on an application running on a client such as one of clients 101, 103, 105, and 107 of FIG. 1 using data retrieved by a cloud service server such as cloud service server 111 of FIG. 1 from a database such as database 113 of FIG. 1. In various embodiments, user interface 800 is a screen of an automatically generated application that can be created by a user with little to no programming experience via a cloud service.

In the example shown, the week shown in user interface 800 includes no tasks corresponding to zero total task hours as shown in screen header element 801 and corresponding to zero hours for the segment of static and dynamic user interface segment elements 803. User interface 800 is shown to demonstrate the configuration of actions associated with a segment and its embedded screen. In the example shown, a static segment corresponding to "All Week" of static and dynamic user interface segment elements 803 is selected. Embedded screen element 807 reflects the tasks of the selected week. Since there are no assigned timesheet tasks for the week, no tasks are shown in embedded screen element 807. Instead, embedded screen element 807 includes action user interface elements 811 and 813 as displayed. Action user interface element 811 is a user interface element for copying tasks from the previous week and is labeled "Copy from last week." Action user interface element 813 is a task to generate tasks and is labeled "Generate." In some embodiments, actions can be configured to be displayed only in the event there are no entries for a particular category, such as a selected day or the selected week. In various embodiments, actions can be tied to different specified logic conditions such as an expired task, an upcoming task, a maximum number of tasks is reached, a minimum number of tasks is reached, no tasks exist, etc. In various embodiments, the actions for a segment and embedded screen are configured at 407 of FIG. 4.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving via a form for building an application, an identification of a dynamic specification, wherein the dynamic specification identifies one or more data sources associated with one or more database queries for obtaining a list of categories for different embedded screens of an end-user application; and
automatically generating the end-user application that is configured to dynamically generate for a user interface of the end-user application a different selectable user interface element for each category of the list of categories dynamically obtained by executing the one or more database queries and upon selection of one of the selectable user interface elements, provide on the user interface a corresponding embedded screen of the different embedded screens;
wherein the identified one or more data sources include one or more database tables including a record identifying a week of a year, a record identifying a day in the week of the year, and a record identifying a task in the day in the week of the year.

2. The method of claim 1, wherein the identified one or more data sources include one or more cloud-hosted data sources.

3. The method of claim 1, wherein the end-user application is a mobile application.

4. The method of claim 1, wherein the one or more database tables include at least a first database table with records identifying a category, a second database table with records referencing at least one of the records of the first database table, and a third database table with records referencing at least one of the records of the second database table.

5. The method of claim 1, wherein the end-user application is configured to, upon selection of the one of the selectable user interface elements, initiate a request for content of the corresponding embedded screen.

6. The method of claim 5, wherein a result to the request for the content of the corresponding embedded screen is obtained by executing the one or more database queries defined by the dynamic specification of the identification received via the form for building the application.

7. The method of claim 1, wherein the user interface of the end-user application includes a second selectable user interface element representing the list of categories.

8. The method of claim 7, wherein the second selectable user interface element is statically generated for the user interface of the end-user application.

9. The method of claim 8, wherein the end-user application is configured to, upon selection of the second selectable user interface element, provide on the user interface a corresponding embedded screen associated with the second selectable user interface element.

10. The method of claim 9, wherein the corresponding embedded screen associated with the second selectable user interface element includes content associated with each category of the list of categories dynamically obtained by executing the one or more database queries.

11. The method of claim 7, wherein the second selectable user interface element is configured to have a fixed non-scrollable location.

12. The method of claim 1, further comprising:
receiving via the form for building the application, display parameters for the user interface, wherein the display parameters include one or more relative size parameters associated with the contents of the different generated selectable user interface elements.

13. A system, comprising:
one or more processors; and
a memory coupled to the one or more processors, wherein the memory is configured to provide the one or more processors with instructions which when executed cause the one or more processors to:
receive via a form for building an application, an identification of a dynamic specification, wherein the dynamic specification identifies one or more data sources associated with one or more database queries for obtaining a list of categories for different embedded screens of an end-user application; and
automatically generate the end-user application that is configured to dynamically generate for a user interface of the end-user application a different selectable user interface element for each category of the list of categories dynamically obtained by executing the one or more database queries and upon selection of one of the selectable user interface elements, provide on the user interface a corresponding embedded screen of the different embedded screens;
wherein the identified one or more data sources include one or more database tables including a record identifying a week of a year, a record identifying a day in the week of the year, and a record identifying a task in the day in the week of the year.

14. The system of claim 13, wherein the end-user application is a mobile application and the identified one or more data sources include one or more cloud-hosted data sources.

15. The system of claim 13, wherein the one or more database tables include at least a first database table with records identifying a category, a second database table with records referencing at least one of the records of the first database table, and a third database table with records referencing at least one of the records of the second database table.

16. The system of claim 13, wherein the end-user application is configured to, upon selection of the one of the selectable user interface elements, initiate a request for content of the corresponding embedded screen, and wherein a result to the request for the content of the corresponding embedded screen is obtained by executing the one or more database queries defined by the dynamic specification of the identification received via the form for building the application.

17. The system of claim 13, wherein the user interface of the end-user application includes a second selectable user interface element representing the list of categories, and wherein the second selectable user interface element is statically generated for the user interface of the end-user application.

18. The system of claim 17, wherein the end-user application is configured to, upon selection of the second selectable user interface element, provide on the user interface a corresponding embedded screen associated with the second selectable user interface element, and wherein the corresponding embedded screen associated with the second selectable user interface element includes content associated with each category of the list of categories dynamically obtained by executing the one or more database queries.

19. A computer program product, the computer program product being embodied in a non-transitory computer readable storage medium and comprising computer instructions for:

receiving via a form for building an application, an identification of a dynamic specification, wherein the dynamic specification identifies one or more data sources associated with one or more database queries for obtaining a list of categories for different embedded screens of an end-user application; and automatically generating the end-user application that is configured to dynamically generate for a user interface of the end-user application a different selectable user interface element for each category of the list of categories dynamically obtained by executing the one or more database queries and upon selection of one of the selectable user interface elements, provide on the user interface a corresponding embedded screen of the different embedded screens;

wherein the identified one or more data sources include one or more database tables including a record identifying a week of a year, a record identifying a day in the week of the year, and a record identifying a task in the day in the week of the year.

20. The computer program product of claim 19, wherein the user interface of the end-user application includes a second selectable user interface element representing the list of categories, and the second selectable user interface element is statically generated for the user interface of the end-user application.

* * * * *